(12) United States Patent
Chen et al.

(10) Patent No.: US 11,543,564 B2
(45) Date of Patent: Jan. 3, 2023

(54) METALENS ARRAY AND SPATIAL POSITIONING METHOD BASED ON METALENS ARRAY

(71) Applicant: Nankai University, Tianjin (CN)

(72) Inventors: Shuqi Chen, Tianjin (CN); Wenwei Liu, Tianjin (CN); Dina Ma, Tianjin (CN); Hua Cheng, Tianjin (CN); Jianguo Tian, Tianjin (CN)

(73) Assignee: Nankai University, Tianjin (CN)

( * ) Notice: Subject to any disclaimer, the term of this patent is extended or adjusted under 35 U.S.C. 154(b) by 74 days.

(21) Appl. No.: 17/032,724

(22) Filed: Sep. 25, 2020

(65) Prior Publication Data
US 2022/0018995 A1 Jan. 20, 2022

(30) Foreign Application Priority Data
Jul. 14, 2020 (CN) .......................... 202010672030.2

(51) Int. Cl.
*G02B 3/00* (2006.01)
*G02B 1/00* (2006.01)

(52) U.S. Cl.
CPC ........... *G02B 3/0006* (2013.01); *G02B 1/002* (2013.01)

(58) Field of Classification Search
CPC . G02B 1/002; G02B 1/02; G02B 1/08; G02B 3/0012; G02B 3/0037; G02B 6/107; G02B 2003/0093; G02B 2006/12038; G02B 27/0172; G02B 2207/101; G02B 2207/125; G02B 2027/014; G02B 6/003; G02B 27/0012; G02B 1/041; G02B 3/006; G02B 3/0056; G06T 3/4038; G06T 5/50; B82Y 40/00; B82Y 35/00
See application file for complete search history.

(56) References Cited

U.S. PATENT DOCUMENTS

2020/0225386 A1* 7/2020 Tsai ....................... G02B 1/002

FOREIGN PATENT DOCUMENTS

| CN | 110632684 A | 12/2019 | |
|---|---|---|---|
| CN | 110954974 A | 4/2020 | |
| CN | 111033351 A | 4/2020 | |
| CN | 111221119 A | 6/2020 | |
| CN | 111399261 A | 7/2020 | |
| KR | 20200071586 A | 6/2020 | |
| WO | WO-2019119101 A1 * | 6/2019 | ............. G02B 1/002 |

* cited by examiner

*Primary Examiner* — Alicia M Harrington
(74) *Attorney, Agent, or Firm* — Hamilton, Brook, Smith & Reynolds, P.C.

(57) ABSTRACT

The present disclosure provides a metalens array and a spatial positioning method based on the metalens array. The metalens array includes at least two metalenses, each of the metalenses comprises a plurality of prism cells, each of the prism cells comprises a silicon dioxide substrate and a titanium oxide prism placed on the silicon dioxide substrate, and the plurality of prism cells are arranged periodically.

15 Claims, 5 Drawing Sheets

METALENS ARRAY AND SPATIAL POSITIONING METHOD BASED ON METALENS ARRAY

RELATED APPLICATION(S)

This application claims priority under 35 U.S.C. § 119 or 365 to China, Application No. 202010672030.2, entitled "Metalens Array and Spatial Positioning Method Based on Metalens Array," filed Jul. 14, 2020. The entire teachings of the above application(s) are incorporated herein by reference.

TECHNICAL FIELD

The present disclosure relates to the field of optical technology, in particular to a metalens array and a spatial positioning method based on the metalens array.

BACKGROUND

Conventional lens array for positioning adopted in the prior art has following defects: 1) the conventional lens has a relatively large volume, which is not advantageous to miniaturization of a positioning system; and 2) the conventional lens array has relatively low positioning accuracy.

SUMMARY

Embodiments of the present disclosure provide a metalens array, the metalens array including at least two metalenses, each of the metalenses including a plurality of prism cells, each of the prism cells including a silicon dioxide substrate and a titanium oxide prism placed on the silicon dioxide substrate, wherein the plurality of prism cells are arranged periodically.

Embodiments of the present disclosure further provide a spatial positioning method based on a metalens array, applicable to the metalens array above, including: acquiring an object image of an observed object formed by the metalens array, wherein the object image includes a plurality of images of the observed object, and one metalens corresponds to one image of the observed object; correcting the object image using a genetic algorithm to obtain the corrected object image, wherein to-be-optimized variables of the genetic algorithm include: a scaling amount of the object image in a horizontal direction, a translational amount of the object image in the horizontal direction, a scaling amount of the object image in a vertical direction, a translational amount of the object image in the vertical direction, and a distortion correction factor of the object image; determining, based on the corrected object image, a size of each image of the observed object and an object distance between each two images of the observed object; and determining a spatial position of the observed object based on the sizes and the object distances of the images of the observed object, and a periodicity of the metalens array (i.e., central distance of adjacent metalenses).

Embodiments of the present disclosure further provide an electronic device, including a memory, a processor and computer programs stored on the memory and executable on the processor, wherein the processor implements the steps of the method above when executing the computer programs.

BRIEF DESCRIPTION OF THE DRAWINGS

In order to more clearly illustrate specific embodiments of the present disclosure or technical solutions in the prior art, accompanying drawings which are needed for description of the specific embodiments or the prior art will be introduced briefly below, and apparently, the accompanying drawings in the description below are for some embodiments of the present disclosure. A person ordinarily skilled in the art still could obtain other accompanying drawings in light of these accompanying drawings, without using creative efforts.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Technical solutions of the present disclosure will be described below clearly and comprehensively in conjunction with accompanying drawings, and apparently, the described embodiments are only a part of embodiments of the present disclosure, rather than all embodiments of the present disclosure. All of other embodiments, obtained by those ordinarily skilled in the art based on the embodiments in the present disclosure without using creative efforts, shall fall into the scope of protection of the present disclosure.

The metalens array and the spatial positioning method based on the metalens array of the present disclosure alleviate the technical problems of large lens volume and relatively low positioning accuracy existing in the prior art.

Embodiment 1

An embodiment of the present disclosure provides a metalens array, wherein the metalens array includes at least two metalenses, each metalens includes a plurality of prism cells, each prism cell includes a silicon dioxide substrate and a titanium oxide prism placed on the silicon dioxide substrate, and the plurality of prism cells are arranged periodically.

Figure 1:
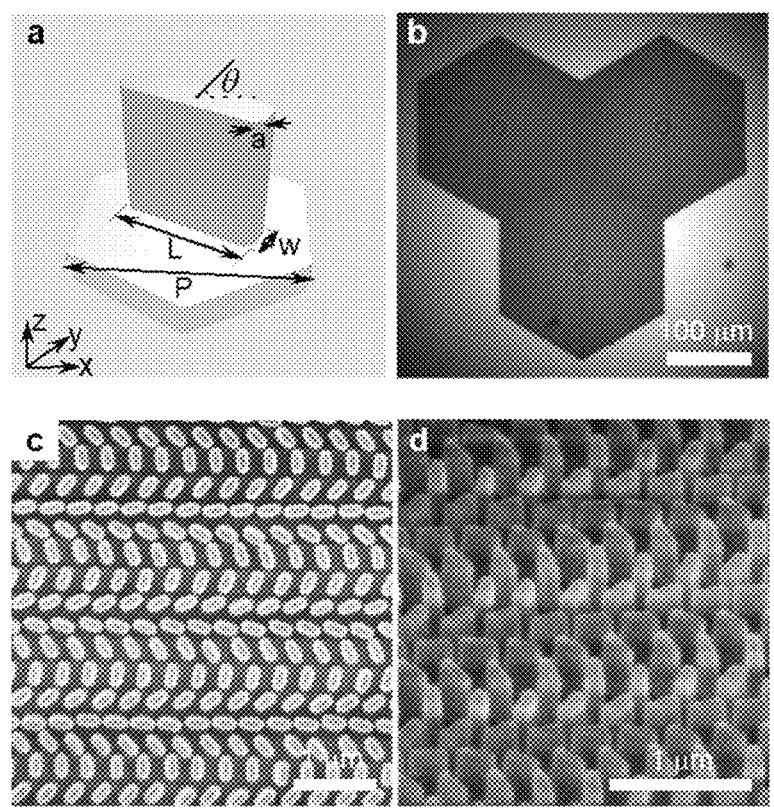
FIG. 1 shows schematic views of a metalens array provided in embodiments of the present disclosure.

Optionally, FIG. 1 shows structural schematic views of the metalens array provided in embodiments of the present disclosure, wherein Drawing a of FIG. 1 is a structural schematic view of the prism cell of the metalens array. As shown by Drawing a of FIG. 1, the titanium oxide prism is an octagonal titanium oxide prism, and the silicon dioxide substrate is in a regular hexagonal structure.

Specifically, as shown by Drawing a in FIG. 1, the titanium oxide prism is obtained by cutting (cutting length a=40 nm) four edges in z direction on the basis of a quadrangular prism (length L=260 nm, width W=90 nm, height=550 nm), and an operation wavelength of the prism cell is 532 nm. The width of the silicon dioxide substrate is P=330 nm. A rotation angle θ of the titanium oxide prism about axis z is related to a transmission light phase: φ=20, where φ represents the transmission light phase; therefore, by changing the rotation angle of the structure point by point, wavefront can be adjusted randomly point by point at a subwavelength scale.

Optionally, the periodical arrangement includes: hexagonal close-packed arrangement. Specifically, as shown in Drawing c and Drawing d of FIG. 1, the plurality of prism cells are in hexagonal close-packed arrangement. Optionally, due to the mode of hexagonal close-packed arrangement, the metalenses obtained are hexagons having an inscribed circle diameter d=189.75 μm.

Optionally, at least two close-packed metalenses are required.

Preferably, as shown by Drawing b of FIG. 1, the metalens array provided in embodiments of the present disclosure includes three metalenses, and the three metalenses are in close-packed arrangement. It should be indicated that the metalenses contained in the metalens array provided in the embodiments of the present disclosure may be of any number, which is not specifically limited herein.

From the above description, it can be seen that the present disclosure provides a metalens array, wherein the metalens array includes at least two metalenses, each metalens includes a plurality of prism cells, each prism cell includes a silicon dioxide substrate and a titanium oxide prism placed on the silicon dioxide substrate, and the plurality of prism cells are arranged periodically. For the periodically arranged metalens array provided in the present disclosure, the lens array is of a submillimeter magnitude and in a single-layer structure, which can improve the positioning accuracy on the basis of ensuring the working efficiency, and alleviate the technical problems of large lens volume and relatively low positioning accuracy existing in the prior art.

Embodiment 2

Figure 2:
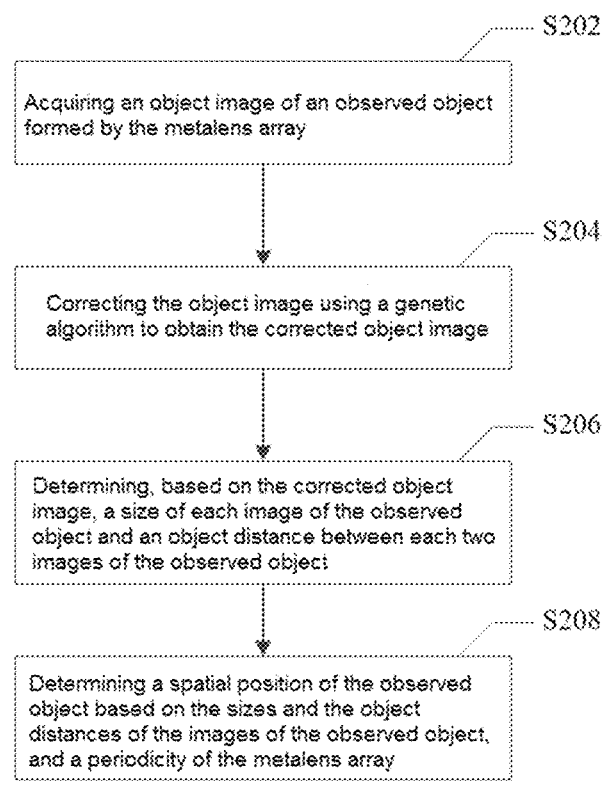
FIG. 2 is a flowchart of a spatial positioning method based on a metalens array provided in embodiments of the present disclosure.

FIG. 2 is a flowchart of a spatial positioning method based on a metalens array provided in embodiments of the present disclosure, and this method is applied to the metalens array in the above Embodiment 1. As shown in FIG. 2, the method specifically includes following steps:

Step S202, acquiring an object image of an observed object formed by the metalens array, wherein the object image includes a plurality of images of the observed object, and one metalens corresponds to one image of the observed object. For example, if the metalens array includes three metalenses, the object image includes three images of the observed object.

Step S204: correcting the object image using a genetic algorithm to obtain the corrected object image, wherein to-be-optimized variables of the genetic algorithm include: a scaling amount of the object image in a horizontal direction, a translational amount of the object image in the horizontal direction, a scaling amount of the object image in a vertical direction, a translational amount of the object image in the vertical direction, and a distortion correction factor of the object image.

Step S206, determining, based on the corrected object image, a size of each image of the observed object and an object distance between each two images of the observed object.

Optionally, a feature point of each image of the observed object in the corrected object image is acquired using a preset feature detection algorithm; a distance between feature points of each two images of the observed object is measured to obtain the object distance; and the size of each image of the observed object in the corrected object image is acquired. For example, the preset feature detection algorithm may be an ORB (Oriented FAST and Rotated BRIEF) feature detection algorithm.

Step S208: determining a spatial position of the observed object based on the sizes and the object distances of the images of the observed object, and a periodicity of the metalens array.

Embodiments of the present disclosure provide a spatial positioning method based on a metalens array, which adopts an image recovery operation based on the genetic algorithm, makes correction for defects of the object image in terms of integrity and aberration and so on, and on the basis of the corrected object image, in conjunction with the periodicity of the metalens array, completes high-precision spatial positioning of the observed object, alleviating the technical problem of low positioning accuracy existing in the prior art.

Optionally, Step S204 further includes following steps:

Step S2041: determining the to-be-optimized variables based on the object image. Optionally, the to-be-optimized variables may include: the scaling amount of the object image in the horizontal direction, the translational amount of the object image in the horizontal direction, the scaling amount of the object image in the vertical direction, the translational amount of the object image in the vertical direction, a first distortion correction factor of the object image, a second distortion correction factor of the object image and a constant factor related to the distortion correction factor.

Step S2042, optimizing the to-be-optimized variables using the genetic algorithm, to obtain the optimized variables, wherein a fitness function of the genetic algorithm is a difference function between each two images of the observed object in the object image. Specifically, initial population in the genetic algorithm refers to individuals containing the above to-be-optimized variables, and then the to-be-optimized variables are optimized by performing crossover and mutation operations on the individuals in the initial population.

Step S2043: correcting the object image based on the optimized variables to obtain the corrected object image.

A process of optimizing the to-be-optimized variables using the genetic algorithm in the embodiments of the present disclosure is described in detail below.

I. First, based on the object image, seven to-be-optimized variables are determined as ($s_x$, $s_y$, $t_x$, $t_y$, $a_1$, $a_2$, c), respectively representing: a scaling amount of the object image in an x direction, a scaling amount of the object image in a y direction, a translational amount of the object image in the x direction, a translational amount of the object image in the y direction, a first distortion correction factor $a_1$, a second distortion correction factor $a_2$, and a factor c (if c>0.5, it indicates that $k_1$ and $k_2$ are both positive, otherwise, both are negative, and $k_1$ and $k_2$ are related to distortion), wherein $$\begin{cases} k_1 = 10^{a_1}, k_2 = 10^{a_2} (c > 0.5) \\ k_1 = -10^{a_1}, k_2 = -10^{a_2} (c \le 0.5), \end{cases} \quad (1)$$

$$\begin{cases} \Delta x = x_r(k_1 r^2 + k_2 r^4) \\ \Delta y = y_r(k_1 r^2 + k_2 r^4), \end{cases} \quad (2)$$

It can be seen from the above that the distortion factor of the image is related to the spatial position change $\Delta x$ and $\Delta y$ of image pixel, that is, the first distortion correction factor and the second distortion correction factor of the object image can be used to correct the distortion of the object image. The 7 variables above are variables for strategy optimization.

II. Revolution Strategy of Genetic Algorithm:

First, setting an initial population: first, generating an initial population, for example, the number of individuals of the initial population is 100, and each individual contains seven to-be-optimized variables above, and meanwhile contains seven mutation parameters;

performing crossover on the initial population: selecting any two individuals from the population, and randomly crossing seven variables and seven mutation intensities contained in each of the two individuals. Child generation is generated in this way, for example, the number of child generations is 20;

performing mutation on the population: the individual of the child generation is mutated in accordance with the mutation intensity (original real number+mutation intensity×random real number satisfying standard normal distribution);

then calculating fitness function of the population containing the initial population and 120 individuals of the child generations of the initial population, and selecting 100 individuals with the best adaptability therefrom as the initial population of the next evolution.

Finally, the above steps are cycled until the fitness function tends to be stable, and the cycling is stopped.

III. Definition of Fitness Function in Genetic Algorithm:

(A) In order to minimize the influence of grayscale information on paired pictures, binarization processing is performed on the object image using a cv2.adaptiveThreshold function, to obtain the object image after binarization processing, and then distortion eliminating processing is performed on the object image, in which process, variables $k_1$, $k_2$, c need to be changed into to-be-optimized variables. Hereinafter, taking the object image formed for the little bug shown in FIG. 3 as an example, a definition process of the fitness function is described, and it should be noted that the number of metalenses in the metalens array used in imaging of the little bug in FIG. 3 is 3, wherein two drawings in part a of FIG. 3 are enlarged views of images of the little bug, and two drawings in part b are original images of the image.

Figure 3:
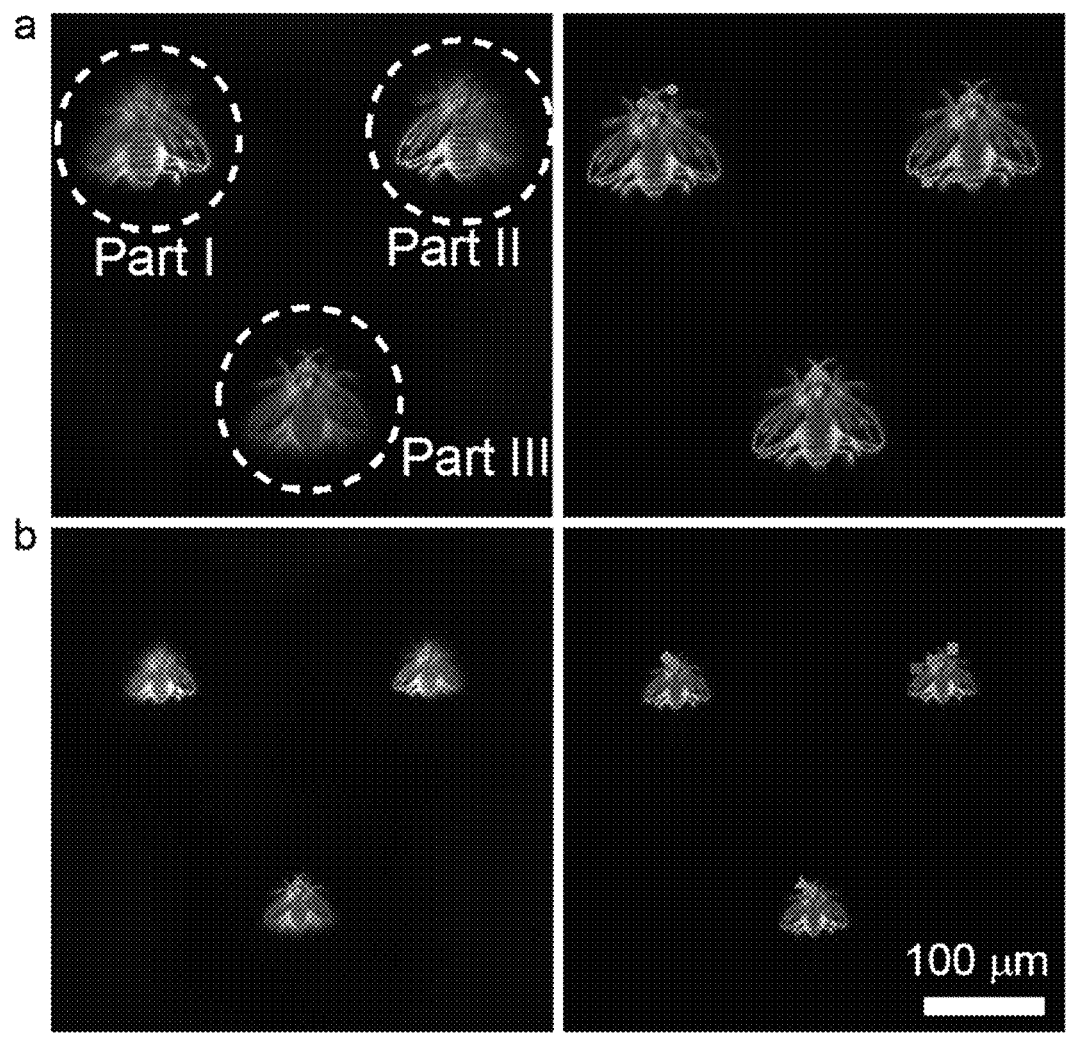
FIG. 3 shows schematic views of imaging a little bug provided in embodiments of the present disclosure.

(B) As shown in FIG. 3, each image is divided into three parts, each part contains a complete sub-drawing (i.e. image of the observed object), from top to bottom, from left to right, denoted by part I, part II, and part III respectively. It should be noted that, since transformation from part III ($P_3$) to part I ($P_1$) and part II ($P_2$) is considered subsequently, both lateral and longitudinal dimensions of part III should be smaller than those of part I and part II.

(C) The part III is scaled. Coordinates of a point $P_3$ (x, y) on the drawing are $P'_3(x', y')$ after scaling. In the above, the above scaling process utilizes variables of two scaling coefficients in the population, and the corresponding relationship between the scaled coordinates is:

$$\begin{pmatrix} x' \\ y' \\ 1 \end{pmatrix} = \begin{pmatrix} s_x & 0 & 0 \\ 0 & s_y & 0 \\ 0 & 0 & 1 \end{pmatrix} \cdot \begin{pmatrix} x \\ y \\ 1 \end{pmatrix} \quad (3)$$

(D) A translation matrix between $P'_3$ and $P_1$ is calculated. $P'_3$ is a matrix of $m'_3 \times n'_3$, and $P_1$ is a matrix of $m_1 \times n_1$. First, zero-padding is performed on $P'_3$, so that the size of the matrix after the padding is consistent with $P_1$, and the matrix after the padding is recorded as $P_{pad}$:

$$P_{pad}(i, j) = \begin{cases} P'_3(i, j) & (0 < i \leq m'_3, 0 < j \leq n'_3) \\ 0 & (m'_3 < i \leq m_1, n'_3 < j \leq n_1) \end{cases} \quad (4)$$

(E) The coordinates after the padding are $x_p$, $y_p$, and the coordinates after translation are x", y". In the above, two translation variables contained in the M matrix are represented by two translation variables in the population:

$$\begin{pmatrix} x'' \\ y'' \\ 1 \end{pmatrix} = \begin{pmatrix} 1 & 0 & t_x \\ 0 & 1 & t_y \\ 0 & 0 & 1 \end{pmatrix} \cdot \begin{pmatrix} x_p \\ y_p \\ 1 \end{pmatrix} \quad (5)$$

Finally, the fitness function is:

$$loss = -\sum_{i=1}^{m_1} \sum_{j=1}^{\lfloor \frac{n_1}{2} \rfloor} |P''_3(i, j) - P_1(i, j)|^2 \quad (6)$$

(F) The method for calculating transformation from part III to part II is the same as above, but loss (fitness function) is different. $P_2$ is a matrix of $m_2 \times n_2$.

$$loss = -\sum_{i=1}^{m_2} \sum_{j=\lfloor \frac{n_2}{2} \rfloor}^{n_2} |P''_3(i, j) - P_2(i, j)|^2 \quad (7)$$

IV. Final Image Generation:

The part I, part II, part III are recombined according to a reverse process of translation, to obtain a processed final image (as shown in the right column of FIG. 3). The feature points of the sub-drawings (for example, dots, square points, and triangular points in the right column of FIG. 3) are respectively obtained using the feature detection method of ORB (Oriented FAST and Rotated BRIEF), and further the distance of each feature point can be measured for realizing positioning.

Figure 4:
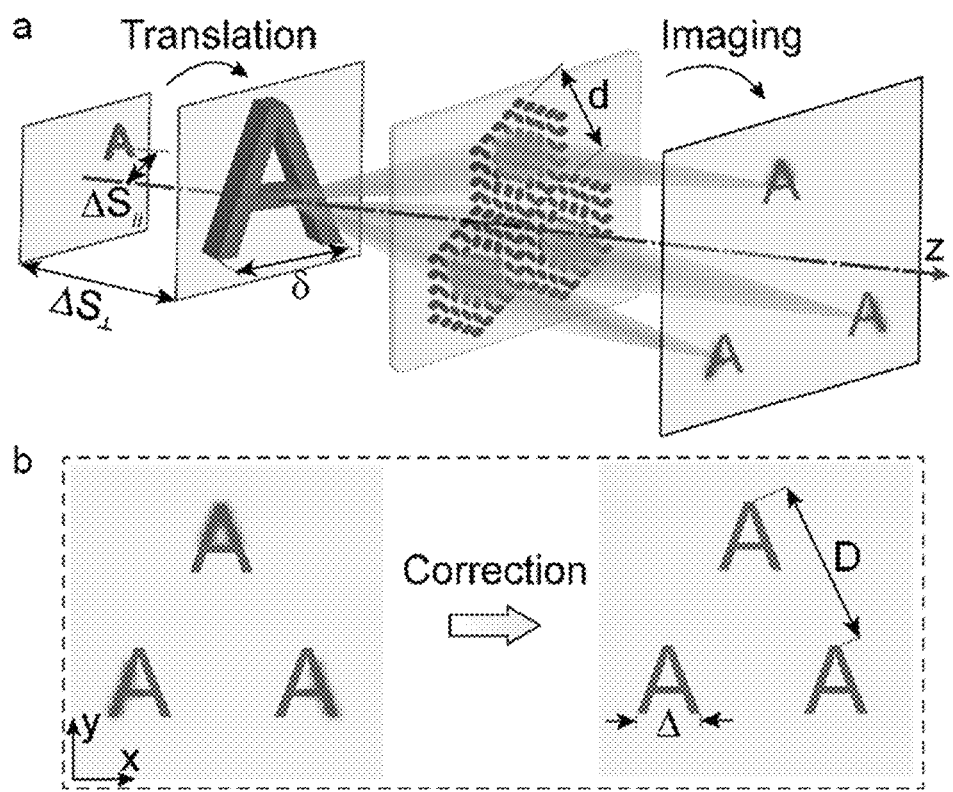
FIG. 4 is a schematic view of performing spatial positioning for an observed object provided in embodiments of the present disclosure.

Optionally, Step S208 further includes following steps:

Step S2081, determining coordinates of the observed object in a direction perpendicular to the horizontal direction through the following formula: $S_\perp = fD/(D-d)$, where $S_\perp$ denotes a first coordinate of the observed object in a direction (i.e., z direction) perpendicular to an observation plane, f denotes a focal length of the metalens, D denotes the object distance, and d denotes the periodicity of the metalens array. FIG. 4 is a schematic view of performing spatial positioning for the observed object provided in embodiments of the present disclosure, wherein Drawing a of FIG. 4 is a schematic view of an imaging process of the observed object, and Drawing b is a schematic view of performing image correction on the object image.

Step S2082, determining the size of the observed object through the following formula: $\delta = \Delta(D-d)/d$, where $\delta$ denotes the size of the observed object, and $\Delta$ denotes the size of the image of the observed object.

As the three-dimensional space is linear, when the size of the object is known, the coordinates of the object in the transverse direction are known as well, and therefore the positioning in direction // (i.e. a direction parallel to plane x-y) is represented with the size of the object.

Step S2083: determining a second coordinate of the observed object on the observation plane based on the size of the observed object.

Step S2084: determining a spatial position of the observed object based on the first coordinate and the second coordinate.

Figure 5:
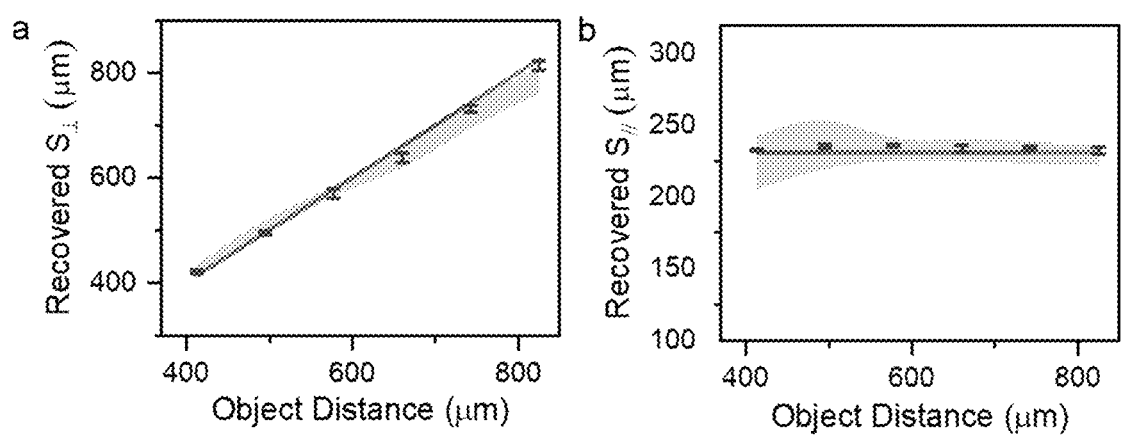
FIG. 5 shows diagrams of positioning data obtained by performing spatial positioning on the observed object (i.e. the little bug) in FIG. 3 with the method provided in embodiments of the present disclosure.

FIG. 5 shows diagrams of positioning data obtained by performing spatial positioning on the observed object in FIG. 3 using the method provided in the embodiment of the present disclosure, wherein the y-axis of the left drawing (i.e. Drawing a) is $S_\perp$, the y-axis of the right drawing (i.e. Drawing b) is $S_{//}$, gray straight line represents theoretical values, light gray region represents an experimental result that has not undergone aberration correction processing, error bars are positioning results that have undergone aberration correction, and height of the error bars represents measurement accuracy.

Embodiments of the present disclosure provide a spatial positioning method based on a metalens array. The observed object is imaged using the metalens array provided in the above Embodiment 1, then, an image correction operation based on a genetic algorithm is performed on the obtained object image, so as to eliminate aberration, and finally, the observed object is spatially positioned in combination with periodicity of the metalens array, thus, high-precision three-dimensional positioning data of the observed object is obtained. The metalens array used in the embodiment of the present disclosure has a small volume and high positioning accuracy for the observed object, and alleviates the technical problems of large lens volume and relatively low positioning accuracy existing in the prior art.

Embodiments of the present disclosure further provide an electronic device, including a memory, a processor and computer programs stored on the memory and executable on the processor, wherein the processor implements the steps of the method in the above Embodiment 2 when executing the computer programs.

Finally, it should be explained that the various embodiments above are merely used for illustrating the technical solutions of the present disclosure, rather than limiting the present disclosure; although the detailed description is made to the present disclosure with reference to various preceding embodiments, those ordinarily skilled in the art should understand that they still could modify the technical solutions recited in various preceding embodiments, or make equivalent substitutions to some or all of the technical features therein; and these modifications or substitutions do not make the corresponding technical solutions essentially depart from the scope of the technical solutions of various embodiments of the present disclosure.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A spatial positioning method based on a metalens array, the metalens array having at least two metalenses, with each of the metalenses comprising a plurality of prism cells, the plurality of prism cells arranged periodically, the method comprising:
   acquiring an object image of an observed object formed by the metalens array, wherein the object image comprises a plurality of images of the observed object, and one metalens corresponds to one image of the observed object;
   correcting the object image using a genetic algorithm to obtain a corrected object image, wherein to-be-optimized variables of the genetic algorithm comprise: a scaling amount of the object image in a horizontal direction, a translational amount of the object image in the horizontal direction, a scaling amount of the object image in a vertical direction, a translational amount of the object image in the vertical direction, and a distortion correction factor of the object image;
   determining, based on the corrected object image, a size of each image of the observed object and an object distance between each two images of the observed object; and
   determining a spatial position of the observed object based on the sizes and the object distances of the images of the observed object, and a periodicity of the metalens array.

2. The method according to claim 1, wherein the step of correcting the object image using a genetic algorithm to obtain a corrected object image comprises:
   determining the to-be-optimized variables based on the object image;
   optimizing the to-be-optimized variables using the genetic algorithm, to obtain optimized variables, wherein a fitness function of the genetic algorithm is a difference function between each two images of the observed object in the object image; and
   correcting the object image based on the optimized variables to obtain the corrected object image.

3. The method according to claim 1, wherein the step of determining based on the corrected object image sizes of the images of the observed object and an object distance between each two images of the observed object comprises:
   acquiring a feature point of each image of the observed object in the corrected object image using a preset feature detection algorithm;
   measuring a distance between feature points of each two images of the observed object to obtain the object distance; and
   obtaining the size of each image of the observed object in the corrected object image.

4. The method according to claim 1, wherein the step of determining a spatial position of the observed object based on the sizes and the object distances of the images of the observed object and a periodicity of the metalens array comprises:
   determining coordinates of the observed object in a direction perpendicular to the horizontal direction through a formula: $S_\perp = fD/(D-d)$, where $S_\perp$ denotes a first coordinate of the observed object in a direction perpendicular to an observation plane, f denotes a focal length of the metalens, D denotes the object distance, and d denotes the periodicity of the metalens array;
   determining the size of the observed object through a formula: $\delta = \Delta(D-d)/d$, where $\delta$ denotes the size of the observed object, and $\Delta$ denotes the size of the image of the observed object;
   determining a second coordinate of the observed object on the observation plane based on the size of the observed object; and
   determining a spatial position of the observed object based on the first coordinate and the second coordinate.

5. The method according to claim 1, wherein each of the prism cells comprises a silicon dioxide substrate and a titanium oxide prism placed on the silicon dioxide substrate, and wherein the titanium oxide prism is an octagonal titanium oxide prism.

6. The method according to claim 5, wherein the step of correcting the object image using a genetic algorithm to obtain a corrected object image comprises:
    determining the to-be-optimized variables based on the object image;
    optimizing the to-be-optimized variables using the genetic algorithm, to obtain optimized variables, wherein a fitness function of the genetic algorithm is a difference function between each two images of the observed object in the object image; and
    correcting the object image based on the optimized variables to obtain the corrected object image.

7. The method according to claim 5, wherein the step of determining based on the corrected object image sizes of the images of the observed object and an object distance between each two images of the observed object comprises:
    acquiring a feature point of each image of the observed object in the corrected image using a preset feature detection algorithm;
    measuring a distance between feature points of each two images of the observed object to obtain the object distance; and
    obtaining the size of each image of the observed object in the corrected object image.

8. The method according to claim 5, wherein the step of determining a spatial position of the observed object based on the sizes and the object distances of the images of the observed object and a periodicity of the metalens array comprises:
    determining coordinates of the observed object in a direction perpendicular to the horizontal direction through a formula: $S_\perp = fD/(D-d)$, where $S_\perp$ denotes a first coordinate of the observed object in a direction perpendicular to an observation plane, f denotes a focal length of the metalens, D denotes the object distance, and d denotes the periodicity of the metalens array;
    determining the size of the observed object through a formula: $\delta = \Delta(D-d)/d$, where $\delta$ denotes the size of the observed object, and $\Delta$ denotes the size of the image of the observed object;
    determining a second coordinate of the observed object on the observation plane based on the size of the observed object; and
    determining a spatial position of the observed object based on the first coordinate and the second coordinate.

9. The method according to claim 1, wherein each of the prism cells comprises a silicon dioxide substrate and a titanium oxide prism placed on the silicon dioxide substrate, and wherein the silicon dioxide substrate is in a regular hexagonal structure.

10. The method according to claim 9, wherein the step of correcting the object image using a genetic algorithm to obtain a corrected object image comprises:
    determining the to-be-optimized variables based on the object image;
    optimizing the to-be-optimized variables using the genetic algorithm, to obtain optimized variables, wherein a fitness function of the genetic algorithm is a difference function between each two images of the observed object in the object image; and
    correcting the object image based on the optimized variables to obtain the corrected object image.

11. The method according to claim 9, wherein the step of determining based on the corrected object image sizes of the images of the observed object and an object distance between each two images of the observed object comprises:
    acquiring a feature point of each image of the observed object in the corrected object image using a preset feature detection algorithm;
    measuring a distance between feature points of each two images of the observed object to obtain the object distance; and
    obtaining the size of each image of the observed object in the corrected object image.

12. The method according to claim 9, wherein the step of determining a spatial position of the observed object based on the sizes and the object distances of the images of the observed object and a periodicity of the metalens array comprises:
    determining coordinates of the observed object in a direction perpendicular to the horizontal direction through a formula: $S_\perp = fD/(D-d)$, where $S_\perp$ denotes a first coordinate of the observed object in a direction perpendicular to an observation plane, f denotes a focal length of the metalens, D denotes the object distance, and d denotes the periodicity of the metalens array;
    determining the size of the observed object through a formula: $\delta = \Delta(D-d)/d$, where $\delta$ denotes the size of the observed object, and $\Delta$ denotes the size of the image of the observed object;
    determining a second coordinate of the observed object on the observation plane based on the size of the observed object; and
    determining a spatial position of the observed object based on the first coordinate and the second coordinate.

13. The method according to claim 1, wherein the periodical arrangement comprises: hexagonal close-packed arrangement.

14. The method according to claim 1, wherein at least two close-packed metalenses are required.

15. An electronic device performing spatial positioning based on a metalens array, the metalens array having at least two metalenses, with each of the metalenses comprising a plurality of prism cells, the plurality of prism cells arranged periodically, the electronic device comprising:
    a memory, a processor and computer programs stored on the memory and executable on the processor, wherein the processor is configured to acquire an object image of an observed object formed by the metalens array, wherein the object image comprises a plurality of images of the observed object, and one metalens corresponds to one image of the observed object;
    correct the object image using a genetic algorithm to obtain a corrected object image, wherein to-be-optimized variables of the genetic algorithm comprise: a scaling amount of the object image in a horizontal direction, a translational amount of the object image in the horizontal direction, a scaling amount of the object image in a vertical direction, a translational amount of the object image in the vertical direction, and a distortion correction factor of the object image;
    determine, based on the corrected object image, a size of each image of the observed object and an object distance between each two images of the observed object; and
    determine a spatial position of the observed object based on the sizes and the object distances of the images of the observed object, and a periodicity of the metalens array.

* * * * *